W. A. READE & G. O. CROMWELL.
COMPOSING MECHANISM FOR TYPOGRAPHS.
APPLICATION FILED MAY 6, 1910.
1,130,432.
Patented Mar. 2, 1915.
7 SHEETS—SHEET 1.
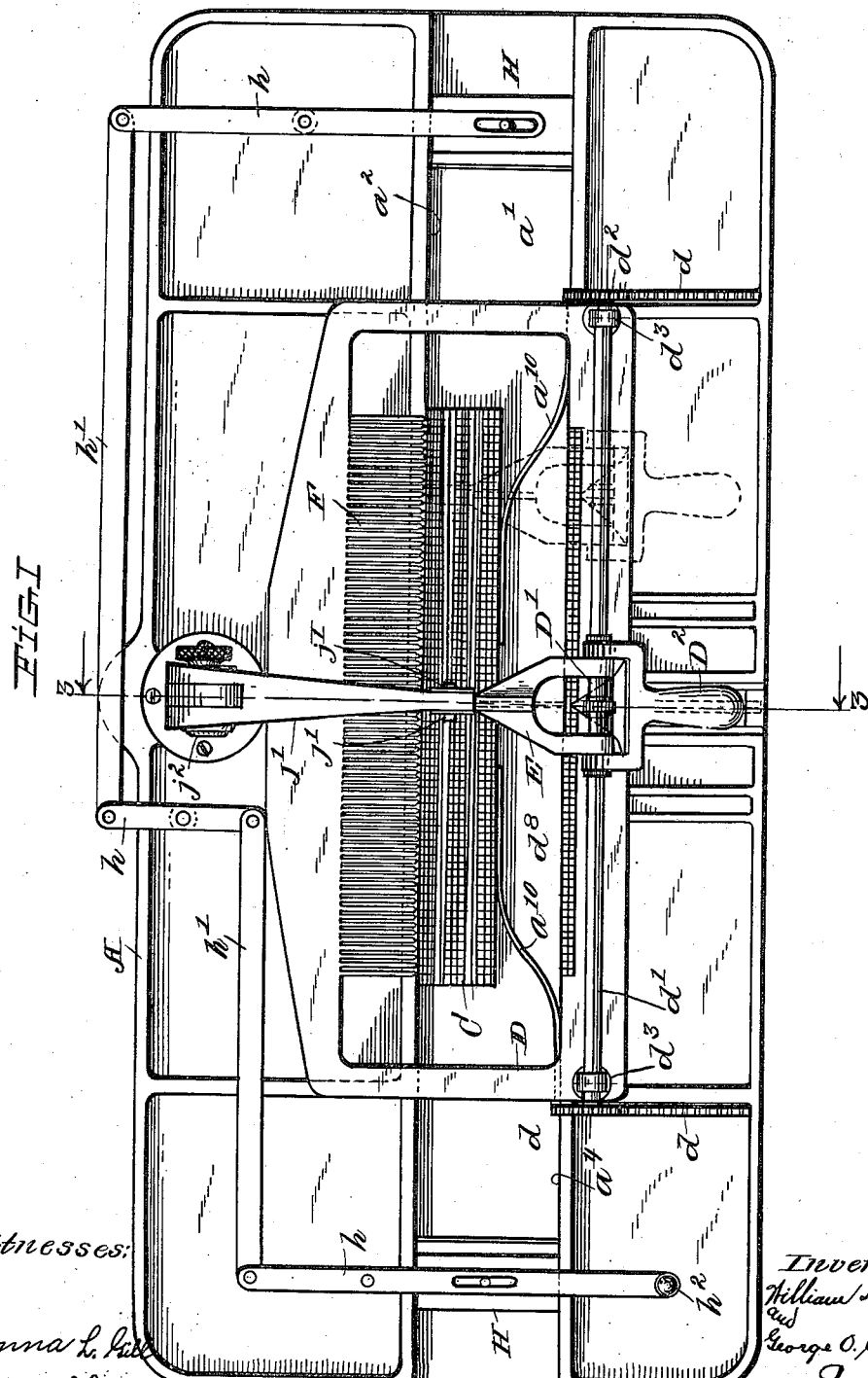

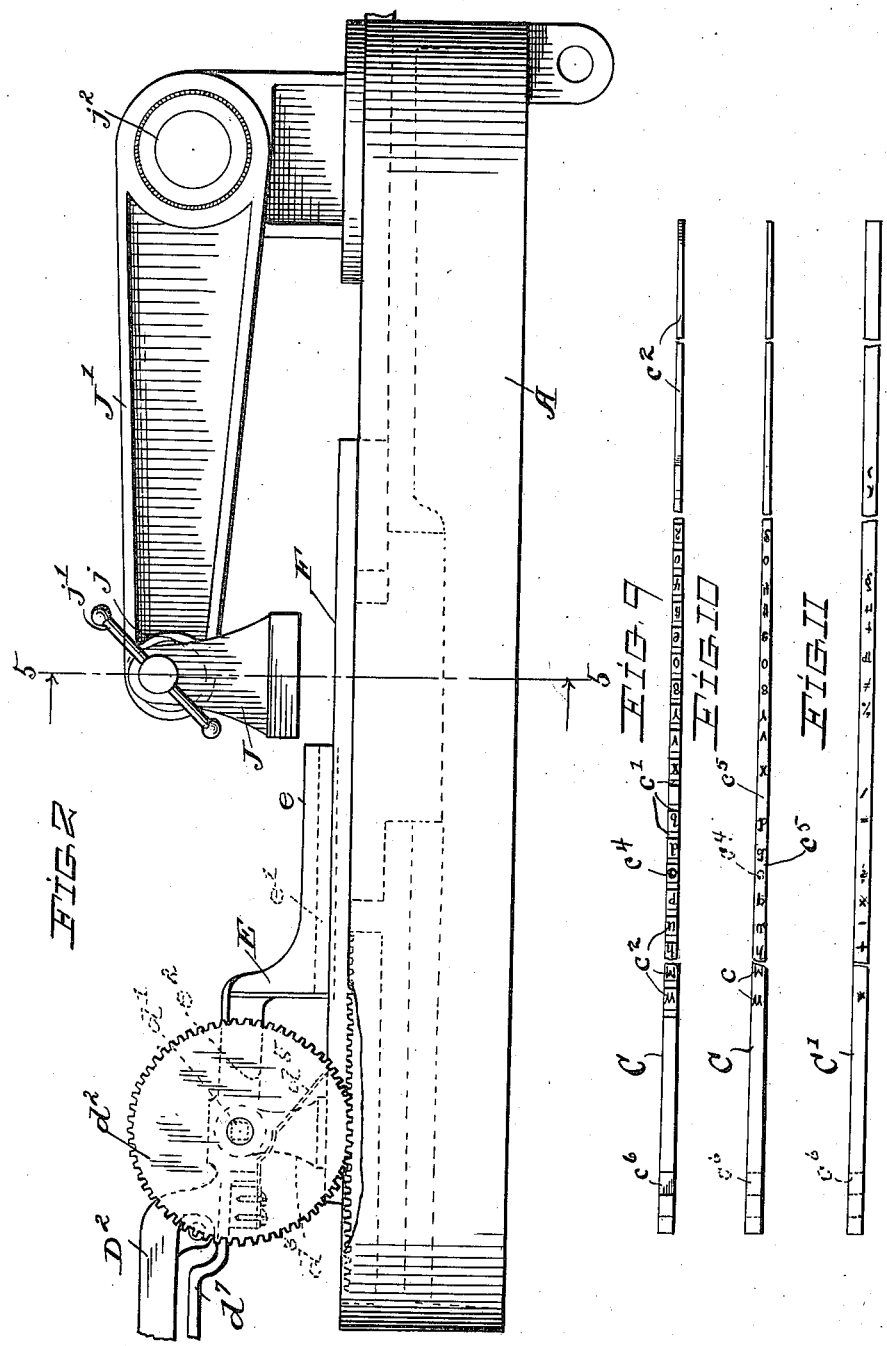

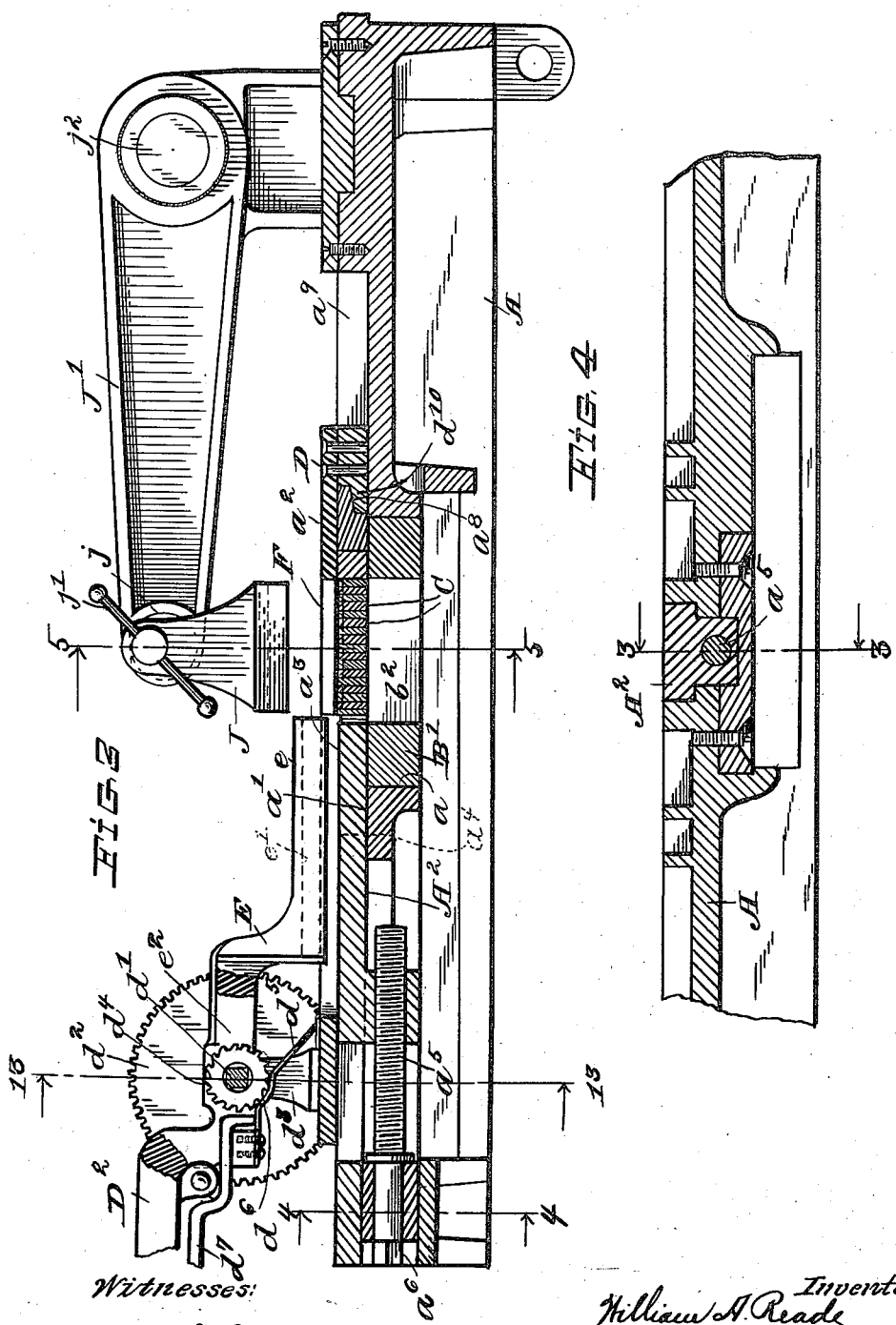

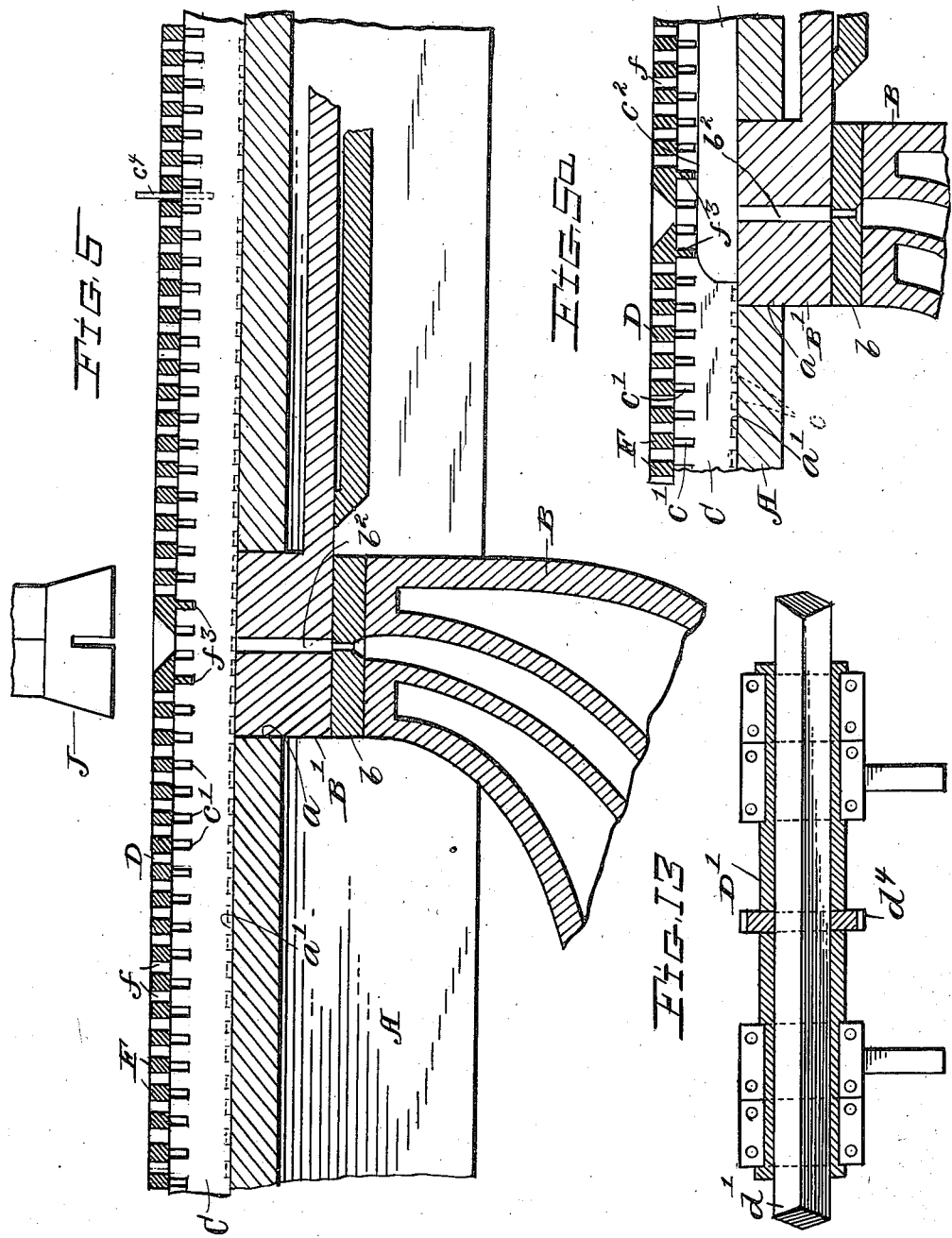

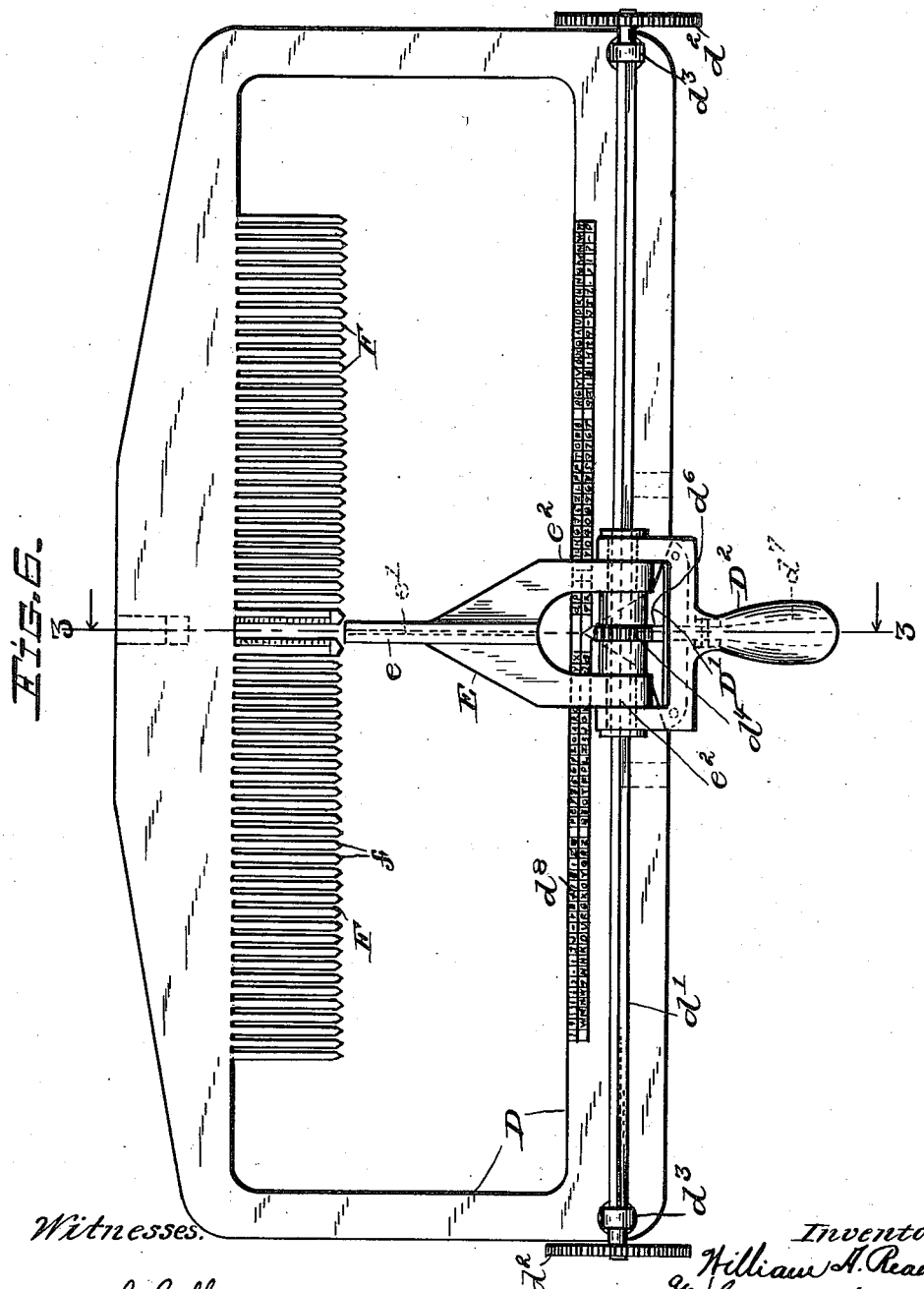

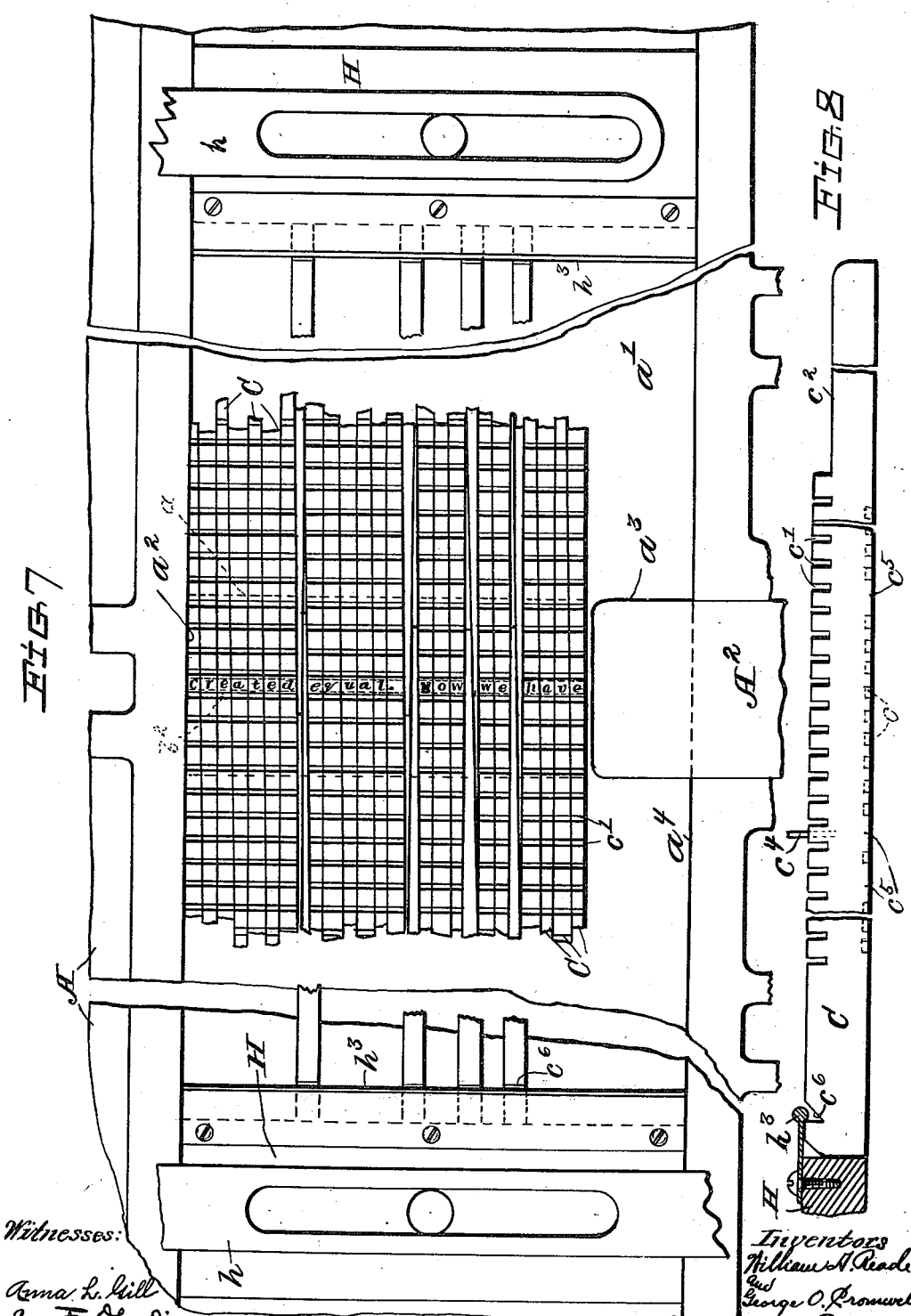

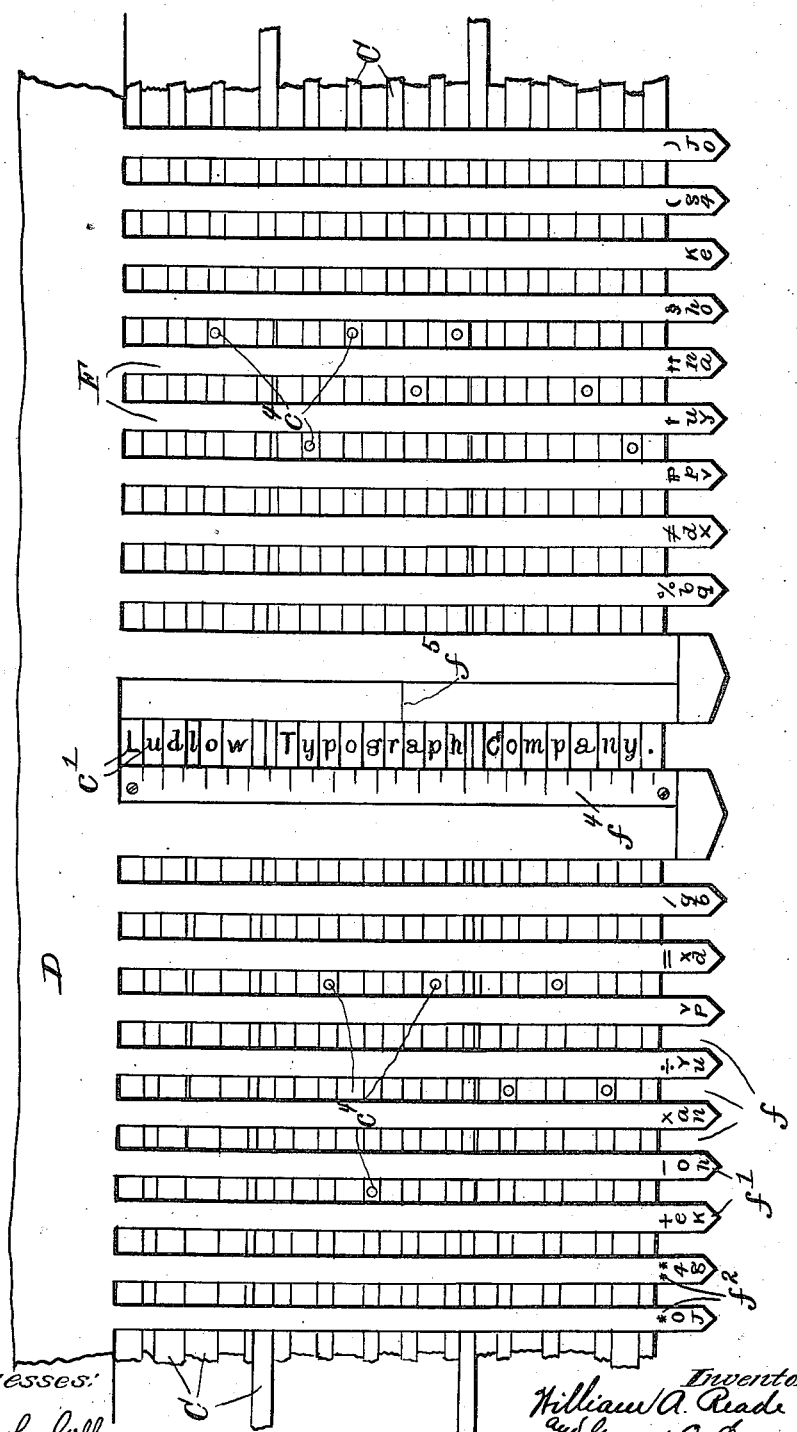

UNITED STATES PATENT OFFICE.

WILLIAM A. READE AND GEORGE O. CROMWELL, OF CLEVELAND, OHIO, ASSIGNORS TO THE LUDLOW TYPOGRAPH COMPANY, OF CLEVELAND, OHIO, A CORPORATION OF MAINE.

COMPOSING MECHANISM FOR TYPOGRAPHS.

1,130,432.  Specification of Letters Patent.  Patented Mar. 2, 1915.

Application filed May 6, 1910. Serial No. 559,835.

*To all whom it may concern:*

Be it known that we, WILLIAM A. READE and GEORGE O. CROMWELL, citizens of the United States, and residents of Cleveland, county of Cuyahoga, State of Ohio, have jointly invented a new and useful Improvement in Composing Mechanism for Typographs, of which the following is a specification, the principle of the invention being herein explained and the best mode in which we have contemplated applying that principle, so as to distinguish it from other inventions.

The present invention, relating as indicated to typographs, has more especial regard to certain improvements in a typograph of the general class found disclosed in U. S. Patent No. 856,531, issued to Washington I. Ludlow, June 11, 1907. In such "Ludlow" typograph, the means for casting the type line comprise a plurality of matrix bars movably resting upon a suitable support which is provided with a transverse casting slot over which such bars are thus adapted to be distributed or "composed", so as to aline the duplicate series of matrices on their under edges as desired.

The present improvements relate to the mechanism provided for the carrying on of the several operations involved, such as conveying the matrix bars to their respective positions, alining, and justifying them, the object being to expedite such operations without, however, departing from the simplicity characteristic of the "Ludlow" machine.

To the accomplishment of this and related objects said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—Figure 1 is a plan view of the composing mechanism of our improved typograph; Fig. 2 is an end elevation thereof; Fig. 3 is a transverse section taken on the line 3—3 Fig. 1; Fig. 4 is a longitudinal section of a portion of such mechanism taken on the line 4—4, Fig. 3; Fig. 5 is a similar section of another detail taken on the line 5—5, Fig. 3; Fig. 5-A is the same as Fig. 5, but with certain parts differently arranged; Fig. 6 is a plan view of the composer frame and associated parts on a somewhat larger scale than in Fig. 1; Fig. 7 is a broken plan view of the composing mechanism with the composer frame omitted, but including the matrix bars and showing the method of justifying a line; Fig. 8 is a broken elevational view of one kind of the matrix bars; Figs. 9 and 10 are similarly broken top and bottom plan views of such a bar; Fig. 11 is a bottom plan view of another kind of matrix bar used in conjunction with bars of the kind illustrated in the preceding figures; Fig. 12 is a detail of the composer frame in position over an assembled body of the bars; Fig. 13 is a sectional view of a detail.

The general supporting frame for the mechanism composing the present invention, is not illustrated but merely the bed plate or top A of such frame, which is utilized as the base or support for the mechanism herein involved. The frame proper it may be explained, is utilized to support the casting mechanism for forming the slugs or lines of type from the matrix provided by the present mechanism, as will hereinafter be more fully explained, but such casting mechanism forms no part of the present invention and accordingly only so much of it is shown as is necessary to an understanding of the operation of the composing mechanism. It may be stated, however, that such present composing mechanism is designed with more or less regard to use with the casting mechanism that forms the subject matter of a co-pending application filed by Edwin S. Carmen, filed February 26, 1910, Serial No. 546,108.

In such casting mechanism then, the part shown for example, in Figs. 5, and 5-A, consists simply of the nozzle or spout B of the casting pot through which the molten metal is forced into the mold B' wherein the slug is formed. Such casting pot spout is terminally closed by a squirt plate $b$ that is designed to be brought directly against the underside of the mold when desired, and then removed so as to permit such mold to be lowered from the bed A of the machine, in order to permit the ejection of the slug therefrom and such further operations upon such slug as are necessary preliminary to its removal to the galley and its setting up in the press form.

It is over a slot $a$ provided in the bed plate or top A for the reception of the casting mold B' that the matrix bars C are placed, and as a convenient support therefor such top is provided with a trough-like depression $a'$ having a depth substantially the same as that of the bars and a width somewhat larger than the maximum length of the line which it may be desired to cast.

The casting mold is designed to fit snugly in slot $a$ and its upper face lies flush with the bottom of the trough $a'$ so that the movement of the bars thereacross is in no wise interferred with. The mold is of course formed with an opening or slot $b^2$ in which the slug is actually cast, and it is over this opening that the matrices on the bars require to be assembled and securely held in position during the casting operation. The major portion of the matrix bars C are made of laterally tapered form, the taper being continuous from one end to the other as shown in Figs. 9 and 10. The matrices $c$ are then struck in, or otherwise formed, on the lower edge of such bar regarding the latter as it rests in the trough, while in the upper edge are provided transverse grooves $c'$ corresponding in position with such matrices, and, in connection with the grooves, a series of characters $c^2$ that likewise correspond with such matrices although not placed directly thereover for reasons that will be explained presently. These bars C are arranged in the trough with their tapered ends alternating with the thick ends, whereby the respective bars are maintained in a line substantially parallel with the trough, whatever variations may be made in their longitudinal position in such trough. Although adjacent bars will thus be seen to bear similar series of matrices, the order of such matrices will obviously be reversed. Moreover, such matrices terminate short of the thin ends of the bars (see Fig. 10), whereby the latter are adapted when overlapping to form a blank space of adjustable width. The upper edges of such thin ends of the bars, furthermore, are cut away as shown at $c^2$, Fig. 8, to a depth equal to that of the grooves $c'$ previously referred to as being formed in such upper edge. In addition to these grooves, each of the matrix bars is provided on the same upper edge with a pin $c^4$, or equivalent projection, that is centrally disposed with, or otherwise bears a fixed relation to the series of matrices on its under edge. Not only are the lower edges of the bars blank at their ends, but a limited number of blank spaces $c^5$ are left among the matrices $c$, being so located along the bar as to provide an assortment of widths. One such blank $c^5$, moreover is located directly below the pin $c^4$ on the bar's upper edge and the arrangement of the others is such that they register with those on adjacent bars, when the two bars are brought up with their ends even, despite the reversed order in which the regular series of characters appear on such bar. This materially facilitates "quadding" or spacing out partial lines.

Aside from the regular set of tapered matrix bars which thus carry matrices constituting a font of type, other bears C' (Fig. 11) with parallel sides are provided to bear matrices of special characters of various kinds that require to be used only at rare intervals. These may obviously be inserted at any place in the body of tapered bars, without disturbing the squaring up of such body of bars as a whole.

As shown in Fig. 3, the opening $b^2$ in the mold, wherein the slug is formed, does not extend entirely across the trough, and this is not necessary even in the case of a mold for casting the widest line. The rearmost end of the opening, however, is designed to be brought flush with the rear wall $a^2$ of the trough $a'$, so that such wall may form an abutment and determine the starting point for the line to be assembled. Transversely disposed with respect to the trough is a slide $A^2$, the inner end $a^3$ of which projects within the front wall $a^4$ of the trough to form a complementary abutment in line with the casting slot. This slide $A^2$ may be adjusted in or out by means of a screw $a^5$ having a squared end $a^6$ for operative purposes, and the abutment $a^3$ thus positioned to accurately define the limit of a line of any desired length. The setting of such slide will hence obviously correspond with the length of opening $b^2$ in the slug casting mold.

For the purpose of variously assembling the matrix bars over the mold opening in the casting slot, we provide coöperating means respectively adapted to bring successive bars in desired position with respect to such mold, or in other words to a fixed transverse line, and to thereupon secure said bars in such selected positions. Such means comprise primarily an open frame D of general rectangular form, that is slidably, or otherwise mounted, upon the bed of the machine, so as to be movable across the bars when the latter are disposed in the trough in such bed (see Fig. 1). Alined with the path of travel of such frame and adjacent to its respective ends, are two racks $d$, and a longitudinal shaft $d'$, rotatably mounted along the front side of the frame, is provided with pinions $d^2$ that mesh with such racks so that rotation of said shaft will serve to advance the frame, as will be obvious. The portion of shaft $d'$ intermediate between the two standards $d^3$ whereby it is thus mounted on the frame, is squared or otherwise formed, so as to slidably receive a two-part sleeve D' but still hold the same against rotation as shown in Fig. 13. Rotatably mounted in turn upon such sleeve, is a transversely disposed member E that extends within the opening of the frame and is utilized in both distributing and collecting the matrix bars, as will be presently described. Such member includes, in addition to two arms $e^2$ pivoted on the sleeve, a portion $e$ formed with a groove $e'$ on its under side of a length substantially equal to the width of the trough $a$. This groove is adapted to receive the pins $c^4$ on the upper edges of the matrix bars in the normal position of the member shown in Fig. 1, and thereby retain such bars in a body for movement back and forth in the trough. By simply turning up member E, however, the bars may be disengaged for the purpose of removing the same from the trough, or the re-arrangement thereof, as occasion may demand. Similarly rotatably mounted upon the sleeve or shaft D', is a handled member $D^2$ including an inner forked portion that embraces the arms $e^2$ of member E and is adapted to carry said member together with the sleeve D' back and forth along the shaft $d'$ and thereby to bring the body of bars, the pins of which are held in the groove of said member E, into any desired position with relation to the casting slot in the trough $a$.

Between the two parts of the sleeve D' is non-rotatably mounted a ratchet wheel $d^4$, and handle member $D^2$ carries on its under side a flat spring $d^5$ provided with a tooth or pawl $d^6$ that normally engages with said ratchet wheel, so that upon depression of the handle, the ratchet wheel, and thereby the shaft $d'$ will be given a partial rotation. Said handled member also carries on its under side a pivoted lever $d^7$, the forward end of which extends over and contacts with the upper face of such spring, the latter being of general triangular form with its forward point terminating adjacent to the front portion of the frame D along which the whole device under consideration, including member E is thus seen to be movably mounted. By suitable actuation of this lever $d^7$, it will be evident (see Fig. 3) that the spring may be depressed so as to disengage tooth $d^6$ from the ratchet wheel, whereupon the handle $D^2$ may be raised without affecting the wheel or shaft, although as soon as the lever is released, the tooth again engages with the wheel and further rotation of the shaft may again be obtained by depressing the handle. It will be understood, of course, that such movement of the handle does not effect any rotative movement of the member E that engages with the bars.

Along the side of the frame D opposite to that upon which the device just described is movably mounted, are provided a series of equidistantly spaced teeth F extending inwardly in a transverse direction with respect to the matrix bars, or in other words parallel with the casting slot. There are as many of these teeth as there are matrices upon the respective matrix bars C composing the normal font, the disposition of such teeth being such that when the centrally mounted pin $c^4$ on any bar is inserted in the slot $f$ between the appropriate teeth F, a particular matrix on the under side of such bar will be positioned directly over the opening $b^2$ in the mold. To indicate which slot is to be selected to thus bring any desired matrix over the mold, the teeth may be provided with designating characters $f'$ as shown in Fig. 12; but preferably we arrange a series of such designating characters $d^8$ along the edge of the other side of the frame over which the point of the spring $d^5$ carried by the handle $D^2$ travels. Inasmuch as the bars to be assembled or composed are carried back and forth in the trough along with such member, determination of the desired position to be given a bar is readily made by noting the position of the spring pointer over the series of character in question.

In view of the reversal of alternate matrix bars in the normal font, a double series of designating characters $f$ requires to be provided upon the teeth F, or arranged along the front portion of the frame as the case may be, one of which series is adapted for use with matrix bars having their thick ends disposed toward the right end of the trough, the other for use with the bars which have their thick ends disposed toward the left of such trough. A supplementary series of characters $f^2$ may be used to indicate the position of the matrices on the upper side of the supernumerary bars that have parallel sides and bear special matrices, as heretofore described. It will be understood, of course, that in the arrangement of the characters on the taper bars, those requiring the largest width will be disposed nearest the thick end of the bar, while those requiring less width will be disposed nearest the other, or thin, end of the bar. Despite this requirement, there will be sufficient opportunity for selection of position to permit the location of those matrices, which have to be most frequently employed, near the center of the bar. Accordingly only relatively short longitudinal movements will be required for the placing of the bars so as to bring the characters most frequently used, over the casting slot; in other words, it will only be relatively rarely that a bar will require to be displaced its full length to bring a character, either at its thick end or thin end, over such slot.

The forward movement of the frame D across the bars, as the latter are thus variously assembled by the operation of the handled device E, slidably carried on the front side of such frame, is stopped by the engagement of a lug or block $d^{10}$ on the under face of its rear side with a corresponding recess $a^8$ formed in the rear wall $a^2$ of the trough. This block slides in a groove or transverse depression $a^9$, and during the movement of the frame assists in guiding the same. In such locked position (see Fig. 3), the teeth F of the frame it will be seen, extend substantially entirely across the body of assembled bars C so that all of the latter that are thus assembled are securely locked against movement longitudinally of the trough. Should there be any extra bars not required for the particular work in hand, these are placed in the front portion of the trough behind springs $a^{10}$ that serve to retain the body of bars actually in use from separating.

Two teeth F located on either side of the central line of the frame, and hence occupying a corresponding relation to the opening in the mold, are considerably heavier than the remaining teeth, as shown in Figs. 5 and 12; in fact each of such central teeth occupy the space that would be occupied by two of such other teeth. These teeth are formed on their under sides with splines $f^3$ adapted to enter the transverse grooves $c'$ previously described as being formed in the upper edges of the several matrix bars. By making the splines and grooves to fit relatively closely, the alinement of the matrices on the under faces of the bars immediately below such two teeth F can be made quite accurate. In other words, the engagement of the pins $c^4$ on the upper edges of the bars with the slots $f$ between the teeth of the frame, serves in a sense, merely as an initial means of locating the bars their final adjustment being effected by engagement of these splines with the grooves on such edges, as will be readily understood.

The inner edges of the upper faces of the two teeth in question are beveled so as to incline downwardly to the opening between the teeth which is of a width substantially equal to the width of a space between two slots on the bars' upper edges, thus permitting the operator to readily see the portions of the upper faces of the several bars. Since these slots are not located directly over the matrices on the under edges of the bars, the characters $c'$ on these spaces will correspond exactly with the matrices located immediately therebeneath. It will hence be seen that visual composition is possible, these characters appearing in the same assembled form as do the matrices on the under faces of the several selected bars. To assist in the composition of the line, the beveled faces of the two teeth in question are respectively provided with a scale $f^4$ in ems corresponding with the length of the line to be cast, and with a central line $f^5$ to assist in the composing of captions or short lines. The em scale is preferably carried on a removable plate so that a corresponding scale may be substituted for whatever length of line is to be cast.

By the foregoing arrangement, the operator can observe the successive placing of the matrices in casting position, and as the line is thus composed, the approximate amount of space to be allowed between successive words can be determined as also the manner in which to split or hyphenate words at the end of the line, without having to try or fit. It has been previously indicated that the spaces between words are formed by the overlapping thin ends of paired bars, and that such space can be made greater or less by varying the relative positions of the bars, as will be readily understood. At the completion of the composing of a line, as shown in Fig. 7 and as may frequently happen, a small space is left over, so that it is necessary to justify the line before casting the slug. This justification, in the case of the present invention, is readily and easily accomplished by simply forcing together the paired matrix bars having their thin ends overlapping to form the spaces between successive words, since such inward movement of these bars will effect a corresponding spreading of the spaces until the entire line is filled. Such inward movement of the bars in question is obtained by the use of two blocks H respectively slidably mounted in either end of the trough $a'$ and beyond the position occupied, even when farthest extended, by the thick ends of the matrix bars. These blocks are operatively connected by a system of levers $h$ and connecting rods $h'$ one of which levers bears a handle $h^2$, so that by manipulation of such handle, both blocks are simultaneously forced inwardly. This inward movement of the blocks is continued until the butt ends of the bars whose thin ends thus overlap to form spaces, are engaged with the result previously noted, namely, that the thin ends wedge apart the distributed body of bars until the line is completely justified. It will be understood, of course, that the actual amount of lateral displacement of the bars ordinarily required is very slight, but a simple movement of the handled lever serves to obtain this important adjustment. The bars thus thrown to one end or the other of the trough for use in justifying the line are, moreover, temporarily secured to the blocks H, as by a resilient plate $h^3$ on the latter, that is adapted to engage a notch $c^6$ provided for this purpose at the thick end of each bar (see Figs. 7 and 8).

In order to securely lock down the bars after they have been thus assembled and justified locking means are provided, such means comprising a vertically movable member J carried by the outer end of the arm J' which extends above the bars C and frame F, the position of such arm and member clearly appearing in Figs. 1 and 3. In the form of construction illustrated, movement of member J is secured by means of an eccentric $j$ connecting the same with the arm, so that by rotating a handle $j'$, the member is forced downwardly. In its lower position it engages the two splined teeth F of the composer frame, as indicated in Fig. 5, and thus locks the portions of the assembled bars lying beneath such teeth securely against the upper face of the mold so as to resist any pressure that may be applied to the under face of such mold when the nozzle of the casting pot is brought up thereagainst. The arm J' that carries such locking member, is furthermore pivotally mounted on the bed of the machine at $j^2$ so as to permit it to be tilted backwardly when it is desired to obtain unhampered access to the trough and bars assembled therein. The distributing member E, however, will pass across beyond this locking member, so that the arm thus requires to be tilted back only on relatively rare occasions, when, as stated, it is desired to entirely clear the trough.

While the operation of the several component parts of our improved typograph has been fully set forth in connection with the description of the structure of such parts, a general review of the operation of the machine as a whole, is desirable.

The several parts of the typograph including the matrix bars appear as in starting position in Fig. 1, where the entire body of bars, it will be seen, are engaged by the distributing member E, so as to be movable back and forth with the latter along the trough. The operator by grasping the handle $D^2$, may accordingly thus move such bars to bring the pin of the rearmost bar into position for engagement with a slot $f$ adjacent to any selected tooth F of the composer frame D. Selection of the desired tooth is facilitated by observation of the characters $f'$ on the teeth or those $d^8$ on the edge of the frame, as the case may be, the latter being more convenient since the pointer plays directly thereover. When the bar is in desired position, a slight downward pressure on the handle will rotate shaft $d'$ sufficiently to move the frame forward until the pin of such outermost bar is engaged between the composer teeth. The same movement frees the pin of such bar from engagement with the groove on the under side of distributing member E. Successive bars may thus be brought into desired position, and be secured in such position by the advance of the composer frame, which it will be seen thus simultaneously releases a bar from the distributing device only to lock the same in place between the selected teeth of the composer frame. When it is desired to leave a space in the assembled series of matrices, the regular procedure will be to leave a pair of bars with their thin ends overlapping, in which case the pins on the upper edges of said bars lie without the reach of the teeth F, while the butt ends of said bars will be in position to be engaged by the reciprocable blocks H in trough $a$, as shown in Fig. 7. Should it, of course, be desired to insure other than normal space at any point in the line, the bar or bars used to form such space may be initially positioned to bring over the casting slot one or more blank spaces $c^5$ and thus provide a space of the desired width, in which event such bars, it is contemplated shall not be engaged by the blocks H in the final justification of the line. These blocks are actuated after the last word or syllable in the line has been set up, so as to wedge apart the assembled words or syllables to form a completely justified line. After the justification of the line has been accomplished, such line is locked in place by bringing down locking member J and the slug then cast in the mold. Upon the removal of the latter with the slug from the position shown in Figs. 1, 3 and 5, what corresponds to the distributing operation takes place; in other words, the bars are again gathered together into a compact body by sweeping member E along the trough, and then tilting the same up so as to engage the now alined row of pins on such bars. Thereupon the composing operation is again repeated to set up another line of type.

Other modes of applying the principle of our invention may be employed instead of the one explained, change being made as regards the mechanism herein disclosed, provided the means stated by any one of the following claims or the quivalent of such stated means be employed.

We therefore particularly point out and distinctly claim as our invention:—

1. In mechanism of the class described, the combination of a suitable support, a plurality of independently movable matrix bars adapted to remain where placed on such support, and a member movable into and out of engagement with said bars, said member also being movable longitudinally of said bars when in engagement therewith to bring successive bars into any desired position on said support with relation to a fixed transverse line.

2. In mechanism of the class described, the combination of a suitable support, a plurality of independently movable matrix bars adapted to remain where placed on such support, and a member movable into and out of engagement with said bars, said member also being directly manually movable longitudinally of said bars when in engagement therewith to bring successive bars into any desired position on said support with relation to a fixed transverse line.

3. In mechanism of the class described, the combination of a suitable support; a plurality of normally independently movable matrix bars adapted to remain where placed on said support; and a member movable into engagement with said bars when collected in a body, said member also being movable longitudinally of said bars when thus in engagement therewith and being adapted thereupon to disengage successive bars, whereby the latter may be left in desired position on said support.

4. In mechanism of the class described, the combination of a suitable support; a plurality of normally independently movable matrix bars adapted to remain where placed on said support; and a member movable into engagement with said bars when collected in a body, said member also being directly manually movable longitudinally of said bars when thus in engagement therewith and being adapted thereupon to disengage successive bars, whereby the latter may be left in desired position on said support.

5. In mechanism of the class described, the combination of a suitable support; a plurality of matrix bars movable thereon, and a member directly manually movable both longitudinally and transversely of said bars and adapted to engage therewith, whereby successive bars may be brought and left in desired position with reference to a fixed transverse line.

6. In mechanism of the class described, the combination of a suitable support, a plurality of matrix bars movable thereon, a member movable into and out of engagement with said bars, said member also being movable longitudinally of said bars and adapted when in engagement therewith to bring successive bars into desired position with relation to a fixed transverse line, and means operatively connected with said member and adapted, following the positioning of a bar, to secure the same in its selected position.

7. In mechanism of the class described, the combination of a suitable support, a plurality of matrix bars movable thereon, a member directly manually movable both longitudinally and transversely of said bars and adapted to engage therewith, whereby successive bars may be brought and left in desired position with reference to a fixed transverse line, and means adapted, following the positioning of each bar, to secure the same in its selected position.

8. In mechanism of the class described, the combination of a suitable support; a plurality of matrix bars movably resting thereon; composer means movable into engagement with said bars and adapted to hold the same in various selected positions; and other directly manually operable means adapted to move said bars when in a collected body longitudinally of said bars and to leave successive bars in desired position on said support.

9. In mechanism of the class described, the combination of a suitable support; a plurality of matrix bars movably resting thereon; composer means movable into engagement with said bars and adapted to hold the same in various selected positions; other directly manually operable means adapted to move said bars in a collected body longitudinally of themselves and to leave successive bars in desired position on said support; and means adapted to move said composer means and effect engagement between the same and said bars as thus positioned.

10. In mechanism of the class described, the combination of a suitable support; a plurality of normally independently movable matrix bars adapted to remain where placed on said support; composer means movable transversely of said bars into engagement therewith; and other directly manually operable means adapted to move said bars in a collected body longitudinally of themselves and to leave successive bars in desired position on said support.

11. In mechanism of the class described, the combination of a suitable support; a plurality of normally independently movable matrix bars adapted to remain where placed on said support; and a member movable longitudinally of said bars and adapted to engage therewith when collected in a body, said member being transversely shiftable to disengage successive bars, whereby the latter may be left in desired position on said support.

12. In mechanism of the class described, the combination of a suitable support, a plurality of matrix bars movable thereon, and a member movable both longitudinally and transversely of said bars and adapted to engage therewith, whereby successive bars may be brought and left in desired position with reference to a fixed transverse line.

13. In mechanism of the class described, the combination of a suitable support, a plurality of matrix bars movable thereon, a member movable into and out of engagement with said bars, said member being also movable longitudinally of said bars when in engagement therewith to bring successive bars into desired position with relation to a fixed transverse line, and means adapted, following the positioning of a bar, to secure the same in its selected position.

14. In mechanism of the class described, the combination of a suitable support, a plurality of matrix bars movable thereon, a member movable both longitudinally and transversely of said bars and adapted to engage therewith, whereby successive bars may be brought and left in desired position with reference to a fixed transverse line, and means adapted, following the positioning of each bar, to secure the same in its selected position.

15. In mechanism of the class described, the combination of a suitable support; a plurality of matrix bars movably resting thereon; composer means movable relatively to said bars and adapted to engage with the same in various selected positions; and other means adapted to move said bars when in a collected body, longitudinally of said bars, said last-named means being transversely shiftable to leave successive bars in desired position on said support.

16. In mechanism of the class described, the combination of a suitable support; a plurality of matrix bars movably resting thereon; composer means movable relatively to said bars and adapted to engage with the same in various selected positions; other means adapted to move said bars in a collected body longitudinally of themselves, said last-named means being transversely shiftable to leave successive bars in desired position on said support; and means adapted to move said composer means and effect engagement between the same and said bars as thus positioned.

17. In mechanism of the class described, the combination of a suitable support; a plurality of normally independently movable matrix bars adapted to remain where placed on said support; composer means movable transversely of said bars and adapted variously to engage therewith; and other means adapted to move said bars in a collected body longitudinally of themselves, said last-named means being transversely shiftable to leave successive bars in desired position on said support.

18. In mechanism of the class described, the combination of a suitable support; a plurality of independently movable matrix bars on said support; and a member movable longitudinally of said bars, said member being also movable in another direction to engage and disengage said bars as a body, and in yet another direction to disengage said bars individually.

19. In mechanism of the class described, the combination of a suitable support; a plurality of independently movable matrix bars on said support; a member movable longitudinally of said bars, said member being also movable in another direction to engage and disengage said bars as a body, and in yet another direction to disengage said bars individually; and means adapted following the disengagement of the individual bars to secure the same in selected position.

20. In mechanism of the class described, the combination of a suitable support; a plurality of independently movable matrix bars on said support; and a member movable longitudinally of said bars, said member being oscillatory in a transverse plane to engage and disengage said bars as a body, and said member being also rectilinearly movable transversely of said bars to disengage the same individually.

21. In mechanism of the class described, the combination of a suitable support; a plurality of independently movable matrix bars on said support; a member movable longitudinally of said bars, said member being oscillatory in a transverse plane to engage and disengage said bars as a body, and said member being also rectilinearly movable transversely of said bars to disengage the same individually; and means adapted following the disengagement of the individual bars to secure the same in selected position.

22. In mechanism of the class described, the combination of a suitable support; a plurality of independently movable matrix bars on said support; and a member directly manually movable longitudinally of said bars, said member being also movable in another direction to engage and disengage said bars as a body, and in yet another direction to disengage said bars individually.

23. In mechanism of the class described, the combination of a suitable support; a plurality of independently movable matrix bars on said support; a member directly manually movable longitudinally of said bars, said member being also movable in another direction to engage and disengage said bars as a body, and in yet another direction to disengage said bars individually; and composer means movable transversely of said bars and adapted to engage with the same in various selected positions.

24. In mechanism of the class described, the combination of a suitable support; a plurality of independently movable matrix bars on said support; a member directly manually movable longitudinally of said bars, said member being oscillatory in a transverse plane to engage and disengage said bars as a body, and said member being also rectilinearly movable transversely of said bars to disengage the same individually; and composer means movable transversely of said bars and adapted to engage the same individually in selected position.

25. In mechanism of the class described, the combination of a suitable support, a plurality of matrix bars movable on said support, composer means movable transversely of said bars and adapted variously to engage therewith, and a member movable both longitudinally and transversely of said bars, whereby successive bars may be brought and left in desired position with reference to said composer means.

26. In mechanism of the class described, the combination of a suitable support, a plurality of matrix bars movable on said support, composer means movable transversely of said bars and adapted variously to engage therewith, a member movable both longitudinally and transversely of said bars, whereby successive bars may be brought and left in desired position with reference to said composer means, and means adapted, incidentally to the positioning of each bar, to effect engagement between said composer means and the immediately preceding bar.

27. In mechanism of the class described, the combination of a substantially horizontal support, a plurality of matrix bars movably resting thereon, an upwardly extending projection on each of said bars, and a transversely disposed member movable longitudinally of said bars and adapted to engage with the projections thereon when the latter are alined in the collected condition of said bars, said member being transversely shiftable to disengage successive bars and leave the same in desired position on said support.

28. In mechanism of the class described, the combination of a substantially horizontal support, a plurality of matrix bars movably resting thereon, an upwardly extending projection on each of said bars, and a transversely disposed member movable both longitudinally and transversely of said bars and adapted to engage with the projections thereon, whereby successive bars may be brought and left in desired position with respect to a fixed transverse line.

29. In mechanism of the class described, the combination of a substantially horizontal support, a plurality of matrix bars movably resting thereon, an upwardly extending projection on each of said bars, a transversely disposed member movable longitudinally of said bars and adapted to detachably engage with the projections thereon, whereby successive bars may be brought and left in desired position with respect to a fixed transverse line, and a transversely moving member provided with transverse guides adapted on transverse movement of said member, to receive the projections on successive bars and secure the latter in such selected positions.

30. In mechanism of the class described, the combination of a substantially horizontal support, a plurality of matrix bars movably resting thereon, an upwardly extending projection on each of said bars, a transversely disposed member movable both longitudinally and transversely of said bars and adapted to engage with the projections thereon, whereby successive bars may be brought and left in desired position with respect to a fixed transverse line, and another member provided with a series of transverse teeth forming guides adapted to receive the projections on the bars and secure the latter in such selected positions.

31. In mechanism of the class described, the combination of a substantially horizontal support, a plurality of matrix bars movably resting thereon, an upwardly extending projection on each of said bars, a transversely disposed member movable both longitudinally and transversely of said bars and adapted to engage with the projections thereon, whereby successive bars may be brought and left in desired position with respect to a fixed transverse line, and another member movable transversely of said bars and provided with a series of similarly disposed guides adapted to receive the projections on the bars and secure the latter in such selected positions.

32. In mechanism of the class described, the combination of a substantially horizontal support, a plurality of matrix bars movably resting thereon, an upwardly extending projection on each of said bars, a transversely disposed member movable both longitudinally and transversely of said bars and adapted to engage with the projections thereon, whereby successive bars may be brought and left in desired position with respect to a fixed transverse line, another member movable transversely of said bars and provided with a series of similarly disposed teeth forming guides adapted to receive the projections on the bars and secure the latter in such selected positions, and means adapted to move said two members across said bars in unison.

33. In mechanism of the class described, the combination of a substantially horizontal support, a plurality of matrix bars movably resting thereon, an upwardly extending projection on each of said bars, a frame movable across said bars, a transversely disposed member mounted on said frame so as to be movable longitudinally of said bars, said member being adapted to engage with the projections on the latter, whereby successive bars may be brought and left in desired position with respect to a fixed transverse line, and a series of transverse guides on said frame adapted to receive the projections on the bars and secure the latter in such selected positions.

34. In mechanism of the class described, the combination of a substantially horizontal support, a plurality of matrix bars resting thereon, an upwardly extending projection on each of said bars, an open frame movable across said bars, a transversely disposed member mounted on one side of said frame so as to be movable longitudinally of said bars, said member extending within the opening in said frame and being adapted to engage with the projections on said bars, whereby successive bars may be brought and left in desired position with respect to a fixed transverse line, and a series of teeth on the other side of said frame projecting within such opening and forming transverse guides adapted to receive the projections on the bars and secure the latter in such selected positions.

35. In mechanism of the class described, the combination of a substantially horizontal support, a plurality of matrix bars movably resting thereon, an upwardly extending projection on each of said bars, a frame movable across said bars, a transversely disposed member mounted on said frame so as to be movable longitudinally of said bars, said member being adapted to engage with the projections on the latter, whereby successive bars may be brought and left in desired position with respect to a fixed transverse line, a series of transverse guides on said frames adapted to receive the projections on the bars and secure the latter in such selected positions, and means connected with said member for moving the same longitudinally of said frame, adapted also to move said frame across said bars.

36. In mechanism of the class described, the combination of a substantially horizontal support, a plurality of matrix bars movably resting thereon, an upwardly extending projection on each of said bars, an open frame movable across said bars, a transversely disposed member mounted on one side of said frame so as to be movable longitudinally of said bars, said member extending within the opening in said frame and being adapted to engage with the projections on said bars, whereby successive bars may be brought and left in desired position with respect to a fixed transverse line, a series of teeth on the other side of said frame projecting within such opening and forming transverse guides adapted to receive the projections on the bars and secure the latter in such selected positions, and means, connected with said member for moving the same longitudinally of said frame, adapted also to move said frame across said bars.

37. In mechanism of the class described, the combination of a substantially horizontal support, a plurality of matrix bars movably resting thereon, an upwardly extending projection on each of said bars, a frame movable across said bars, a longitudinally disposed shaft rotatably mounted on said frame, and a member mounted on said shaft so as to be movable along the same, said member extending transversely over said bars and being adapted to engage with the projections thereon, whereby successive bars may be brought and left in desired position with respect to a fixed transverse line.

38. In mechanism of the class described, the combination of a substantially horizontal support, a plurality of matrix bars movably resting thereon, an upwardly extending projection on each of said bars, a frame movable across said bars, a rack alined with the direction of movement of said frame, a longitudinally disposed shaft rotatably mounted on said frame and provided with a pinion in mesh with said rack, a member mounted on said shaft so as to be movable along the same, said member extending transversely over said bars and being adapted to engage with the projections thereon, whereby successive bars may be brought and left in desired position with respect to a fixed transverse line, and means, connected with said member for moving the same along said shaft, adapted also to rotate the latter when desired to move said frame across said bars.

39. In mechanism of the class described, the combination of a substantially horizontal support, a plurality of matrix bars movably resting thereon, an upwardly extending projection on each of said bars, a frame movable across said bars, a rack alined with the direction of movement of said frame, a longitudinally disposed shaft rotatably mounted on said frame and provided with a pinion in mesh with said rack, a member mounted on said shaft so as to be movable along the same, said member extending transversely over said bars and being adapted to engage with the projections thereon, whereby successive bars may be brought and left in desired position with respect to a fixed transverse line, and a handle connected with said member for moving the same along said shaft, said handle being rotatable about said shaft and having pawl and ratchet connection therewith, whereby said shaft may be rotated when desired to move said frame across said bars.

40. In mechanism of the class described, the combination of a substantially horizontal support, a plurality of matrix bars movably resting thereon, an upwardly extending projection on each of said bars, a frame movable across said bars, a longitudinally disposed shaft rotatably mounted on said frame, a member mounted on said shaft so as to be movable along the same, said member extending transversely over said bars and being adapted to engage with the projections thereon, whereby successive bars may be brought and left in desired position with respect to a fixed transverse line, a series of transverse guides on said frame adapted to receive the projections on the bars and secure the latter in such selected position, and means, connected with said member for moving the same along said shaft, adapted also to move said frame across said bars.

41. In mechanism of the class described, the combination of a substantially horizontal support, a plurality of matrix bars movably resting thereon, an upwardly extending projection on each of said bars, an open frame movable across said bars, a rack alined with the direction of movement of said frame, a longitudinally disposed shaft rotatably mounted on said frame and provided with a pinion in mesh with said rack, a member mounted on said shaft so as to be movable along the same, said member extending transversely over said bars and being adapted to engage with the projections thereon, whereby successive bars may be brought and left in desired position with respect to a fixed transverse line, means connected with said member for moving the same along said shaft, adapted also to rotate the latter when desired to move said frame across said bars, and a series of teeth on the other side of said frame projecting within the opening therein and forming transverse guides adapted to receive the projections on the bars and secure the latter in such selected positions.

42. In mechanism of the class described, the combination of a substantially horizontal support, a plurality of matrix bars movably resting thereon, an upwardly extending projection on each of said bars, an open frame movable across said bars, a rack alined with the direction of movement of said frame, a longitudinally disposed shaft rotatably mounted on said frame and provided with a pinion in mesh with said rack, a member, mounted on said shaft so as to be movable along the same, said member extending transversely over said bars and being adapted to engage with the projections thereon, whereby successive bars may be brought and left in desired position with respect to a fixed transverse line, a handle connected with said member for moving the same along said shaft, said handle being rotatable about said shaft and having pawl and ratchet connection therewith, whereby said shaft may be rotated when desired to move said frame across said bars, and a series of teeth on the other side of said frame projecting within the opening therein and forming transverse guides adapted to receive the projections on the bars and secure the latter in such selected positions.

43. In mechanism of the class described, the combination of a suitable support, a plurality of matrix bars movable thereon, a member movable longitudinally of said bars and detachably engaging therewith, whereby successive bars may be brought and left in desired position with reference to a fixed transverse line, and a relatively fixed series of designating characters adjacent to the path of travel of said member and corresponding with the matrices on said bars, said fixed series of characters being arranged so that upon registration of said member with any one thereof the corresponding matrix of the bar being positioned will be properly located with reference to such transverse line.

44. In mechanism of the class described, the combination of a suitable support, a plurality of matrix bars movable thereon, a frame movable across said bars, a transversely disposed member mounted on said frame so as to be movable longitudinally of said bars and adapted to engage therewith whereby successive bars may be brought and left in desired position with reference to a fixed transverse line, and a series of designating characters on said frame adjacent to the path of travel of said member and corresponding with the matrices on said bars.

45. In mechanism of the class described, the combination of a suitable support, a plurality of matrix bars movable thereon, an open frame movable across said bars, a transversely disposed member mounted on one side of said frame so as to be movable longitudinally of said bars, said member extending within the opening in said frame and detachably engaging with said bars, whereby successive bars may be brought and left in desired position with reference to a fixed transverse line, means on the other side of said frame adapted to secure said bars in selected position, and a series of designating characters on such first side adjacent to the path of travel of said member and corresponding with the matrices on said bars.

46. In mechanism of the class described, the combination of a suitable support, a plurality of laterally tapered matrix bars movable thereon and arranged side by side, adjacent bars having their thin ends oppositely directed and bearing similar series of matrices but in reverse order, a member movable longitudinally of said bars and detachably engaging therewith, whereby successive bars may be brought and left in desired position with reference to a fixed transverse line, and two relatively fixed series of designating characters adjacent to the path of travel of said member and respectively corresponding with reversely arranged series of matrices on said bars, said characters being arranged so that upon registration of said member with any one thereof the corresponding matrix of the bar being positioned will be properly located with reference to such transverse line.

47. In mechanism of the class described, the combination of a suitable support, a plurality of laterally tapered matrix bars movable thereon and arranged side by side, adjacent bars having their thin ends oppositely directed and bearing similar series of matrices but in reverse order, a frame movable across said bars, a transversely disposed member mounted on said frame so as to be movable longitudinally of said bars and adapted to engage therewith whereby successive bars may be brought and left in desired position with reference to a fixed transverse line, and two series of designating characters on said frame adjacent to the path of travel of said member and respectively corresponding with the reversely arranged series of matrices on said bars.

48. In mechanism of the class described, the combination of a suitable support, a plurality of laterally tapered matrix bars movable thereon and arranged side by side, adjacent bars having their thin ends oppositely directed and bearing similar series of matrices but in reverse order, an open frame movable across said bars, a transversely disposed member mounted on one side of said frame so as to be movable longitudinally of said bars, said member extending within the opening in said frame and detachably engaging with said bars, whereby successive bars may be brought and left in desired position with reference to a fixed transverse line, means on the other side of said frame adapted to secure said bars in selected position, and two series of designating characters on said first side adjacent to the path of travel of said member and respectively corresponding with reversely arranged series of matrices on said bars.

49. The combination with a suitable support provided with a transverse casting slot; of a plurality of matrix bars arranged side by side on said support, said bars having series of matrices on their lower edges adapted to be assembled into a line over such slot; a member movable across said bars and adapted variously to engage therewith to secure said bars in such assembled position; and a vertically movable member located substantially over such slot and adapted to press down upon said first member and thus on said bars over such slot.

50. The combination with a suitable support provided with a transverse casting slot; of a plurality of matrix bars arranged side by side on said support, said bars having series of matrices on their lower edges adapted to be assembled into a line over such slot; an upwardly extending projection on each of said bars, an open frame movable across said bars, a series of teeth on one side of said frame projecting within the opening therein and forming transverse guides adapted to receive the projections on said bars and secure the latter in selected position; an arm extending above said bars and frame; and a vertically movable member carried by said arm and adapted when lowered, to press down upon said first member and thus on said bars over such slot.

51. The combination with a suitable support provided with a transverse casting slot; of a plurality of matrix bars arranged side by side on said support, said bars having series of matrices on their lower edges adapted to be assembled into a line over such slot; an upwardly extending projection on each of said bars; an open frame movable across said bars; a series of teeth on one side of said frame projecting within the opening therein and forming transverse guides adapted to receive the projections on said bars and secure the latter in selected position; a tiltable arm extending above said bars and frame; and a vertically movable member carried by said arm and adapted when lowered to press down upon said first member and thus on said bars over such slot.

52. The combination with a suitable support provided with a transverse casting slot; of a plurality of matrix bars arranged side by side on said support, said bars having a series of matrices on their lower edges adapted to be assembled into a line over such slot; an arm extending above said bars; and a vertically movable member carried by said arm and adapted when lowered to press down upon said bars.

53. The combination with a suitable support provided with a transverse casting slot; of a plurality of matrix bars arranged side by side on said support, said bars having a series of matrices on their lower edges adapted to be assembled into a line over such slot; a tiltable arm extending above said bars; and a vertically movable member carried by said arm and adapted when lowered to press down upon said bars.

Signed by us this 3rd day of May, 1910.

WILLIAM A. READE.
GEORGE O. CROMWELL.

Attested by—
ANNA L. GILL,
JNO. F. OBERLIN.